US009136783B2

(12) United States Patent
Mitsutani

(10) Patent No.: US 9,136,783 B2
(45) Date of Patent: Sep. 15, 2015

(54) VEHICLE, POWER SUPPLY SYSTEM, AND METHOD FOR CONTROLLING POWER SUPPLY SYSTEM

(71) Applicant: Noritake Mitsutani, Toyota (JP)

(72) Inventor: Noritake Mitsutani, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/044,528

(22) Filed: Oct. 2, 2013

(65) Prior Publication Data
US 2014/0111120 A1 Apr. 24, 2014

(30) Foreign Application Priority Data
Oct. 19, 2012 (JP) ................................. 2012-231813

(51) Int. Cl.
| | | |
|---|---|---|
| *H02P 1/00* | (2006.01) | |
| *B60L 9/00* | (2006.01) | |
| *H02P 6/00* | (2006.01) | |
| *B60L 11/18* | (2006.01) | |
| *B60L 15/00* | (2006.01) | |
| *H02H 9/00* | (2006.01) | |

(52) U.S. Cl.
CPC ................ *H02P 6/001* (2013.01); *B60L 11/18* (2013.01); *B60L 15/00* (2013.01); *H02H 9/001* (2013.01); *Y02T 10/6239* (2013.01); *Y02T 10/7005* (2013.01); *Y02T 10/7077* (2013.01)

(58) Field of Classification Search
CPC . Y02T 10/62; Y02T 10/6213; Y02T 10/6221; Y02T 10/6278; Y02T 10/6286; Y02T 10/70; Y02T 10/7005; Y02T 10/7022; Y02T 10/7038; Y02T 10/7044; Y02T 10/7055; Y02T 10/7077; Y02T 10/6239; H02P 6/001; B60L 11/18; B60L 15/00; H02H 9/001
USPC ................ 318/139, 272, 275, 277, 282, 286, 318/466–469, 629; 307/9.1, 10.1; 180/65.225, 65.24, 65.265, 65.29; 320/126; 701/22, 51, 53; 290/31
See application file for complete search history.

(56) References Cited

U.S. PATENT DOCUMENTS

| | | | |
|---|---|---|---|
| 2009/0039703 A1* | 2/2009 | Soma et al. ................... | 307/10.1 |
| 2009/0108674 A1* | 4/2009 | Ozaki et al. .................. | 307/10.6 |
| 2009/0160249 A1* | 6/2009 | Soma et al. .................... | 307/9.1 |

(Continued)

FOREIGN PATENT DOCUMENTS

| | | |
|---|---|---|
| JP | 2007-244125 A | 9/2007 |
| JP | 2008-154439 A | 7/2008 |

(Continued)

*Primary Examiner* — Bentsu Ro
*Assistant Examiner* — Zemenay Truneh
(74) *Attorney, Agent, or Firm* — Kenyon & Kenyon LLP

(57) ABSTRACT

When an ECU disconnects a second power storage device BAT2 from a drive device 90 while a hybrid vehicle is traveling, ECU disconnects one of a contact point B1 and a contact point G2 of a system main relay SMR2 and causes the vehicle to continue traveling using electric power supplied from a first power storage device BAT1 to drive device. After the vehicle finishes traveling, ECU performs a discharging operation for discharging a charge remaining in a first capacitor C1 and a second capacitor C2 with the one contact point of system main relay SMR2 being disconnected. If the charge is not discharged appropriately, ECU determines that welding occurs in at least one of system main relay SMR1 and system main relay SMR2.

7 Claims, 7 Drawing Sheets

(56) References Cited

U.S. PATENT DOCUMENTS

| | | | |
|---|---|---|---|
| 2010/0001523 A1* | 1/2010 | Sato et al. | 290/31 |
| 2010/0038962 A1 | 2/2010 | Komatsu | |
| 2010/0100265 A1* | 4/2010 | Kato | 701/22 |
| 2010/0164278 A1* | 7/2010 | Oyobe et al. | 307/9.1 |
| 2010/0222952 A1* | 9/2010 | Yamaguchi | 701/22 |
| 2010/0296204 A1 | 11/2010 | Ichikawa et al. | |
| 2011/0066311 A1* | 3/2011 | Itagaki | 701/22 |
| 2013/0264975 A1 | 10/2013 | Kaita et al. | |

FOREIGN PATENT DOCUMENTS

| | | |
|---|---|---|
| JP | 2009-142102 A | 6/2009 |
| JP | 2010-252475 A | 11/2010 |
| JP | 2012234697 A | 11/2012 |
| WO | 2008/081983 A1 | 7/2008 |
| WO | 2012/085992 A1 | 6/2012 |

* cited by examiner

VEHICLE, POWER SUPPLY SYSTEM, AND METHOD FOR CONTROLLING POWER SUPPLY SYSTEM

This nonprovisional application is based on Japanese Patent Application No. 2012-231813 filed on Oct. 19, 2012 with the Japan Patent Office, the entire contents of which are hereby incorporated by reference.

BACKGROUND OF THE INVENTION

1. Field of the Invention

The present invention relates to a vehicle, a power supply system, and a method for controlling a power supply system. In particular, the present invention relates to a vehicle, a power supply system, and a method for controlling a power supply system using relay circuits for connecting and disconnecting a plurality of power storage devices.

2. Description of the Background Art

There has been known a power supply system including a main battery (hereinafter referred to as a first power storage device) and a sub battery (hereinafter referred to as a second power storage device) that are mounted in a vehicle and connected, in parallel with each other, to a load such as a traveling motor, via respective relay devices as switches (see, for example, Japanese Patent Laying-Open No. 2009-142102 and the like).

In the configuration of Japanese Patent Laying-Open No. 2009-142102, a capacitor is connected between a positive electrode-side line and a negative electrode-side line transmitting electric power to the load.

Further, Japanese Patent Laying-Open No. 2010-252475 discloses a power supply system having a capacitor as described in Japanese Patent Laying-Open No. 2009-142102, wherein the capacitor is discharged within a period in which an instruction for disconnection is output to a relay device, and whether or not a contact point of the relay device is welded is determined based on whether or not a voltage across the capacitor is reduced.

However, in a configuration as described in Japanese Patent Laying-Open No. 2009-142102, the second power storage device may be disconnected from the power supply system while the vehicle is traveling, due to a reduction in remaining capacity and the like. A contact point of the relay device having performed the disconnection is opened when it is operated normally. Thus, in a case where the determination of welding described in Japanese Patent Laying-Open No. 2010-252475 is performed in the configuration as described in Japanese Patent Laying-Open No. 2000-142102, the contact point of the relay device is required to be reconnected after the vehicle finishes traveling, which increases the number of times the contact point of the relay is actuated, and may lead to a shortened life of the relay device on the contrary.

The present invention has been made to solve the aforementioned problem, and one object of the present invention is to provide a power supply system having a switch for switching between supply and interruption of electric power between a power storage device and a load, in which the number of times each contact point is connected during a check for welding performed on the switch is decreased and the location of a defect can be efficiently specified.

SUMMARY OF THE INVENTION

The present invention is directed, in short, to a vehicle, including a power supply system, a drive device driving using electric power supplied from the power supply system, and a control device performing control of the power supply system and the drive device. The power supply system includes a first power storage device capable of supplying electric power to the drive device, a second power storage device connected to the drive device in parallel with the first power storage device, a first switch switching between supply and interruption of the electric power between the first power storage device and the drive device, a second switch having a first contact point connected to a positive electrode of the second power storage device and a second contact point connected to a negative electrode of the second power storage device for individually switching between supply and interruption of electric power from the second power storage device to the drive device, and a capacitor connected between paths coupling the second switch to the drive device. When the control device disconnects the second power storage device from the drive device while the vehicle is traveling, the control device disconnects one of the first contact point and the second contact point of the second switch and causes the vehicle to continue traveling using the electric power supplied from the first power storage device to the drive device, and after the vehicle finishes traveling, the control device performs a discharging operation for discharging a charge remaining in the capacitor with the one contact point of the second switch being disconnected, and if the charge is not discharged appropriately, the control device determines that welding occurs in at least one of the first switch and the second switch.

Preferably, the first switch has a first contact point connected to a positive electrode of the first power storage device and a second contact point corrected to a negative electrode of the first power storage device for individually switching between supply and interruption of the electric power to the drive device, and, if the charge is not discharged appropriately even when the discharging operation is performed with the one contact point of the second switch being disconnected, the control device disconnects both of the first contact point and the second contact point of one of the first switch and the second switch and performs a second discharging operation, and if the charge is not discharged appropriately from the capacitor after the second discharging operation is performed, the control device specifies a location of the welding in the first switch or the second switch.

More preferably, the first power storage device includes a high-output type battery, and the second power storage device includes a high-capacity type battery.

More preferably, the vehicle further includes a voltage conversion device converting a voltage between the first power storage device and the drive device.

More preferably, the drive device includes a rotating electric machine and an engine, and the control device disconnects the second switch in response to a shift from EV traveling in which the vehicle is caused to travel using a drive force of the rotating electric machine to HV traveling in which a drive force of the engine is additionally used.

More preferably, the present invention is directed to a power supply system for supplying electric power to a load. The power supply system includes a first power storage device capable of supplying electric power to the load, a second power storage device connected to the load in parallel with the first power storage device, a first switch switching between supply and interruption of the electric power between the first power storage device and the load, a second switch having a first contact point connected to a positive electrode of the second power storage device and a second contact point connected to a negative electrode of the second power storage device for individually switching between supply and interruption of electric power from the second power storage device to the load, a capacitor connected between paths coupling the second switch to the load, and a control device. When the control device disconnects the second power storage device from the load while a vehicle is traveling, the control device disconnects one of the first contact point and the second contact point of the second switch and causes the vehicle to continue traveling using the electric power supplied from the first power storage device to the load, and after the vehicle finishes traveling, the control device performs a discharging operation for discharging a charge remaining in the capacitor with the one contact point of the second switch being disconnected, and if the charge is not discharged appropriately, the control device determines that welding occurs in at least one of the first switch and the second switch.

According to another aspect of the present invention, provided is a method for controlling a power supply system for supplying electric power to a load. The power supply system includes a first power storage device capable of supplying electric power to the load, a second power storage device electrically connected to paths supplying the electric power from the first power storage device to the load, and capable of supplying electric power to the load, a first switch switching between supply and interruption of the electric power between the first power storage device and the load, a second switch having a first contact point connected to a positive electrode of the second power storage device and a second contact point connected to a negative electrode of the second power storage device for individually switching between supply and interruption of the electric power to the load, and a capacitor connected between paths coupling the second switch to the load. The method for controlling includes the steps of: disconnecting, when the second power storage device is disconnected from the load while a vehicle is traveling, one of the first contact point and the second contact point of the second switch, and causing the vehicle to continue traveling using the electric power supplied from the first power storage device to the load; performing, after the vehicle finishes traveling, a discharging operation for discharging a charge remaining in the capacitor with the one contact point of the second switch being disconnected; and determining, if the charge is not discharged appropriately, that welding occurs in at least one of the first switch and the second switch.

According to the present invention, in a power supply system having a switch for switching between supply and interruption of electric power between a power storage device and a load, when the second power storage device is disconnected from the load while the vehicle is traveling, one of the first contact point and the second contact point of the second switch is disconnected, and the other contact point is kept connected. Thus, there is no need to reconnect the other contact point of the second switch after the vehicle finishes traveling, which decreases the number of times each contact point is connected during a check for welding performed on the switch, and can efficiently specify the location of a defect.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
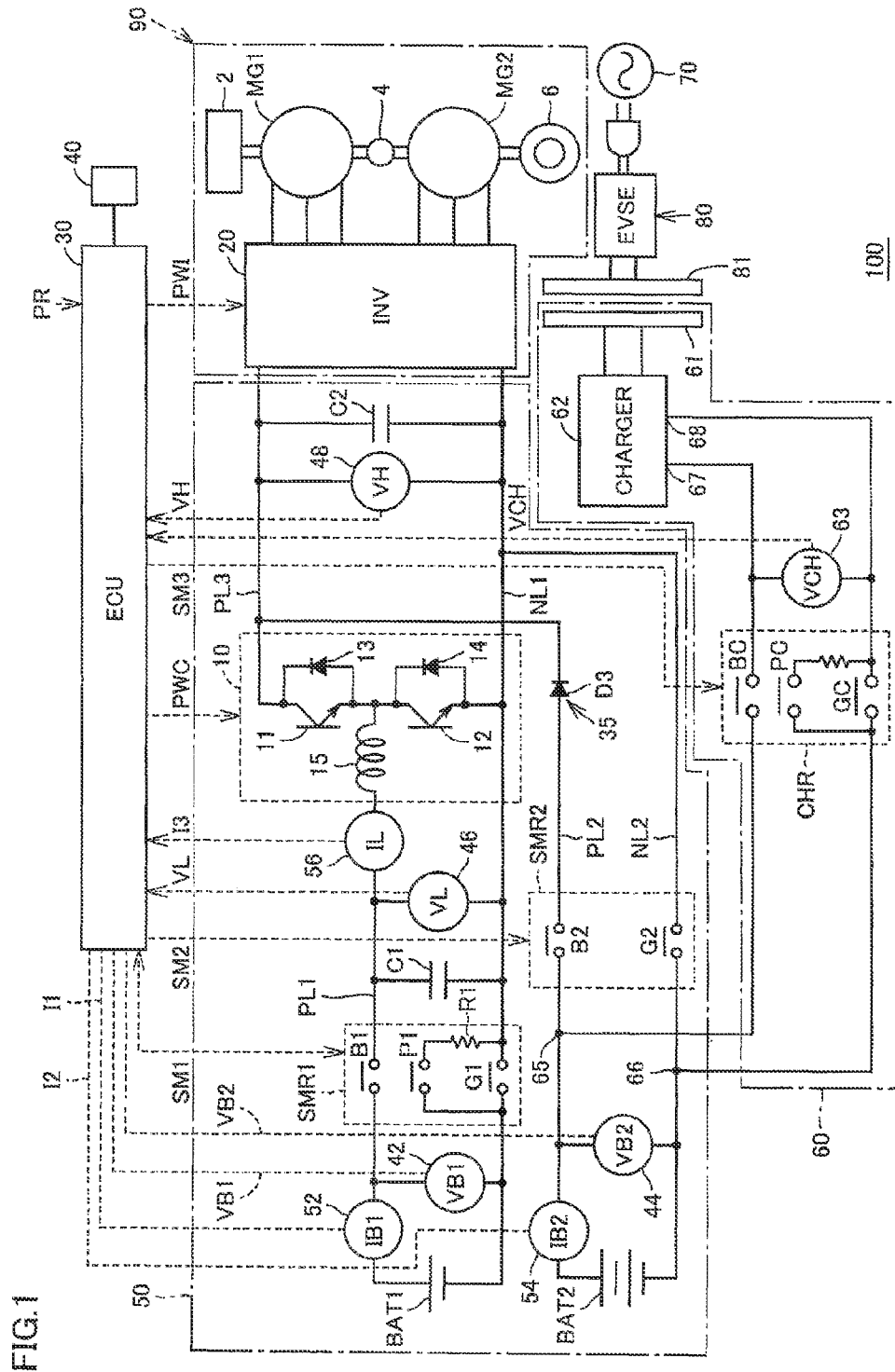
FIG. 1 is an overall block diagram of a hybrid vehicle equipped with a power supply system in accordance with an embodiment of the present invention.

Hereinafter, an embodiment of the present invention will be described with reference to the drawings. In the description below, identical parts will be designated by the same reference numerals. Since their names and functions are also the same, the detailed description thereof will not be repeated.

Configuration of Vehicle

FIG. 1 is an overall block diagram of a hybrid vehicle equipped with a power supply system 50 in accordance with an embodiment of the present invention.

Referring to FIG. 1, a hybrid vehicle 100 includes power supply system 50, a drive device 90, and an ECU (Electronic Control Unit) 30 as a control device controlling power supply system 50 and drive device 90.

Power supply system 50 includes a first power storage device BAT1, a second power storage device BAT2, system main relays SMR1, SMR2, a converter unit 10, a first capacitor C1, a second capacitor C2, a backflow prevention circuit 35, voltage sensors 42, 44, 46, 48, and current sensors 52, 54, 56.

As first and second power storage devices BAT1, BAT2, a secondary battery such as a lithium ion battery, a nickel hydride battery, a lead acid battery, or the like may be used. Further, they can be any power storage device that can be charged and discharged, such as a capacitor. Second power storage device BAT2 is connected to drive device 90 in parallel with first power storage device BAT1.

First power storage device BAT1 is connected to converter unit 10 as a voltage conversion device, via system main relay SMR1.

A voltage VB1 of first power storage device BAT1 is detected by voltage sensor 42, and a detected value of voltage VB1 is output to ECU 30. A current I1 supplied from first power storage device BAT1 to converter unit 10 is detected by current sensor 52, and a detected value thereof is output to ECU 30. These values of voltage VB1 and current I1 axe used in ECU 30 to calculate a remaining capacity SOC (State Of Charge) described later, and the like.

System main relay SMR1 includes a contact point G1 connected between a negative electrode of first power storage device BAT1 and a negative electrode line NL1, a contact point P1 connected in series with a limiting resistor R1 between the negative electrode of first power storage device BAT1 and negative electrode line NL1, and a contact point B1 connected between a positive electrode of first power storage device BAT1 and a positive electrode line PL1. ON/OFF states of contact points G1, P1, B1 are controlled individually in response to a control signal SM1 given from ECU 30.

It is noted that, when hybrid vehicle 100 is started, ECU 30 causes contact points B1, P1 of system main relay SMR1 to become conductive to precharge first capacitor C1 and second capacitor C2, and when the precharging is completed, ECU 30 causes contact point G1 to become conductive and then opens contact point P1. By switching contact points G1, P1, B1 in such an order, system main relay SMR1 can supply electric power to an inverter unit 20 with inrush current being suppressed.

First capacitor C1 is provided between positive electrode line PL1 and negative electrode line NL1 which are paths coupling system main relay SMR1 to converter unit 10, to reduce voltage fluctuation between positive electrode line PL1 and negative electrode line NL1.

Voltage sensor 46 detects a value of a voltage across first capacitor C1, that is, a voltage VL of positive electrode line PL1 with respect to negative electrode line NL1, and outputs the detected value to ECU 30. Current sensor 56 detects a value of a current I3 flowing to a reactor, and outputs the detected value to ECU 30.

Converter unit 10 includes upper and lower arm switching elements 11, 12, upper and lower arm diodes 13, 14, and a reactor 15. Upper and lower arm switching elements 11, 12 are connected in series between a positive electrode line PL3 and negative electrode line NL1.

Upper and lower arm diodes 13, 14 are connected in antiparallel with upper and lower arm switching elements 11, 12, respectively. Reactor 15 is connected between a connection node of upper and lower arm switching elements 11, 12 and positive electrode line PL1.

In the present embodiment, as upper and lower arm switching elements 11, 12, for example, an IGBT (Insulated Gate Bipolar Transistor), a power MOS (Metal Oxide Semiconductor) transistor, a power bipolar transistor, or the like can be used.

Converter unit 10 is basically controlled such that upper and lower arm switching elements 11, 12 are turned ON/OFF complementarily and alternately within each switching period. During a step-up operation, converter unit 10 steps up voltage VL of direct current (DC) power, which is output by first power storage device BAT1, to a voltage VH. The step-up operation is performed by providing electromagnetic energy accumulated in reactor 15 during an ON period of lower arm switching element 12 to positive electrode line PL3, via upper arm switching element 11 and upper arm diode 13 connected in antiparallel therewith.

Further, during a step-down operation, converter unit 10 steps down steps down voltage VH of DC power, which is output by inverter unit 20, to voltage VL. The step-down operation is performed by providing electromagnetic energy accumulated in reactor 15 during an ON period of upper arm switching element 11 to negative electrode line NL1, via lower arm switching element 12 and lower arm diode 14 connected in antiparallel therewith. A voltage conversion ratio (i.e., a ratio between VH and VL) in these step-up and step-down operations is controlled by a ratio between the ON-periods of upper and lower arm switching elements 11, 12 (i.e., a duty ratio) in the switching period. For example, if upper arm switching element 11 is fixed to an ON state and lower arm switching element 12 is fixed to an OFF state, VH=VL (voltage conversion ratio=1.0) can be obtained.

Second capacitor C2 is connected between positive electrode line PL3 and negative electrode line NL1 which are paths electrically coupling converter unit 10 to inverter unit 20, to reduce voltage fluctuation between positive electrode line PL3 and negative electrode line NL1. Voltage sensor 48 detects a voltage across second capacitor C2, and outputs a detected value of voltage VH to ECU 30.

Second power storage device BAT2 is connected to drive device 90 via a positive electrode line PL2 and a negative electrode line NL2. System main relay SMR2 is provided between second power storage device BAT2 and power lines PL2, NL2. System main relay SMR2 switches between supply and interruption of electric power from second power storage device BAT2 to drive device 90.

System main relay SMR2 includes a contact point G2 connected between a negative electrode of second power storage device BAT2 and negative electrode line NL2, and a contact point B2 connected between a positive electrode of second power storage device BAT2 and positive electrode line PL2. However, system main relay SMR2 does not include elements corresponding to limiting resistor R1 and contact point P1 included in system main relay SMR1. ON/OFF states of contact points G2, B2 are controlled individually in response to a signal SM2 given from ECU 30.

When voltage VH exceeds a voltage VB2, control signal SM2 for causing a connection operation to be performed is output from ECU 30, and contact points B2, G2 are connected. Thereby, electric power from second power storage device BAT2 is supplied to inverter unit 20.

Backflow prevention circuit 35 is provided in positive electrode line PL2. Backflow prevention circuit 35 is composed of, for example, a diode D3, and is connected with a direction flowing from positive electrode line PL2 to positive electrode line PL3 being set as a forward direction.

Voltage sensor 44 is connected across second power storage device BAT2. Voltage sensor 44 detects a value of voltage VB2 of second power storage device BAT2, and outputs the detected value to ECU 30. Current sensor 54 detects a value of a current I2 supplied from second power storage device BAT2, and outputs the value to ECU 30. Then, ECU 30 compares the value of voltage VB2 with the value of voltage VH detected by voltage sensor 48, to switch between first power storage device BAT1 and second power storage device BAT2.

First power storage device BAT1 includes a high-output type battery, and the other second power storage device BAT2 includes a high-capacity type battery. It is noted that, as first power storage device BAT1, for example, a secondary battery capable of outputting maximum power greater than that of second power storage device BAT2 can be used. By adapting first power storage device BAT1 to HV traveling described later and composing it of a secondary battery capable of supplying a relatively large current, sufficient output and charging performance can be provided during accelerated/decelerated traveling.

As second power storage device BAT2, a secondary battery having a power storage capacity greater than that of first power storage device BAT1 can be used. By causing second power storage device BAT2 to directly supply electric power to inverter unit 20 without a power conversion device such as converter unit 10 being interposed therebetween, second power storage device BAT2 can be used as a power supply having less power conversion loss and good power energy efficiency during constant speed traveling with less speed change for example when the vehicle is cruising on an expressway or the like.

Thus, a high-power and high-capacity DC power supply can be composed by using either first power storage device BAT1 or second power storage device BAT2 appropriately to suit the situation.

Further, first power storage device BAT1 and second power storage device BAT2 may be a combination of secondary batteries of different types, and a large-capacity capacitor may be used as at least one of first power storage device BAT1 and second power storage device BAT2.

Drive device 90 includes an engine 2, motor generators MG1, MG2 as rotating electric machines, inverter unit 20 supplying electric power to motor generators MG1, MG2, a motive power split mechanism 4 coupling engine 2 and motor generators MG1, MG2, and wheels 6 which are coupled to motive power split mechanism 4 and can be rotated by motive power from engine 2 and motor generators MG1, MG2.

Motor generators MG1, MG2 are controlled by ECU 30. Hybrid vehicle 100 travels using a drive force from at least one of engine 2 and motor generator MG2.

Specifically, hybrid vehicle 100 in the present embodiment can switch between so-called HV traveling in which the vehicle travels using engine 2 and motor generator MG2 and so-called EV traveling in which the vehicle travels using a rotational drive force of motor generator MG2, and can travel with a drive source being automatically selected in accordance with an operation state.

Motor generator MG2 is rotationally driven by electric power supplied from inverter unit 20. Inverter unit 20 is controlled by a control signal PW1 to adjust a rotational torque of motor generator MG2.

During HV traveling, the rotational drive force of motor generator MG2 and a rotational drive force of engine 2 are subjected to torque distribution by motive power split mechanism 4 adjusted by ECU 30. The rotational drive forces subjected to torque distribution are divided toward wheels 6 or motor generator MG1 to rotate wheels 6 or motor generator MG1. Thereby, hybrid vehicle 100 can be caused to travel, or a rotational electromotive force of motor generator MG1 can be obtained.

Further, even during EV traveling, if the rotational torque to be generated in motor generator MG2 is insufficient, ECU 30 causes engine 2 to be started to make up for the insufficient rotational torque using the rotational drive force from engine 2.

In addition, hybrid vehicle 100 in accordance with me present embodiment includes an external charging device 60 charging second power storage device BAT2 using electric power from a power supply external to the vehicle. External charging device 60 includes a charger-side relay switch CHR, a vehicle-side charging port 61, a charger 62, and a voltage sensor 63.

Charger 62 is connected to vehicle-side charging port 61, and is also connected, to second power storage device BAT2 via charger-side relay switch CHR. Further, charger 62 receives alternating current (AC) power transmitted from an external power supply 70 to vehicle-side charging port 61 using a charging cable 80. Then, charger 62 converts the received AC power into DC power, and supplies charging power to second power storage device BAT2.

A contact point BC of charger-side relay switch. CHR has one end 65 connected to the positive electrode of second power storage device BAT2, and the other end connected to an output terminal 67 of charger 62. Further, a contact point GC of charger-side relay switch CHR has one end 66 connected to the negative electrode of second power storage device BAT2, and the other end connected to an output terminal 68 of charger 62. A contact point PC connected in series with a limiting resistor is provided in parallel with contact point GC on the negative electrode side.

Voltage sensor 63 measures a voltage between output terminals 67, 68 of charger 62, and outputs a measured value VCH thereof to ECU 30.

Charging cable 80 is an equivalent of EVSE (Electric Vehicle Supply Equipment) under the SAE standard, and includes a connector portion 81. Connector portion 81 of charging cable 80 is connected to vehicle-side charging port 61 provided in hybrid vehicle 100, and electric power from external power supply 70 is transmitted to hybrid vehicle 100.

Although FIG. 1 shows hybrid vehicle 100 including engine 2 as an electrically powered vehicle to provide a description, the configuration of the vehicle is not particularly limited thereto, and the vehicle may be, for example, an electrically powered vehicle traveling using a motor only, an electrically powered vehicle not having external charging device 60 in a vehicle body, or the like. Alternatively, the vehicle may be a hybrid vehicle using a fuel cell in addition to or instead of engine 2. In this manner, the form and the type of a drive source and the number of drive sources are not particularly limited, and the present invention is also, applicable to a so-called series/parallel type plug-in hybrid vehicle which includes motive power split mechanism 4 and in which motive power of engine 2 is distributed to motor generator MG1 and wheels 6, a so-called series type hybrid vehicle which uses motive power of engine 2 only for power generation by motor generator MG1, and uses only motor generator MG2 to generate a drive force of the vehicle, or other types of hybrid vehicles.

ECU 30 controls power supply system 50 and inverter unit 20 to adjust a drive force when traveling is performed. When the value of voltage VH detected by voltage sensor 48 exceeds the value of voltage VB2, ECU 30 outputs control signal SM2 for connecting a contact point, to system main relay SMR2.

Further, a notification device 40 is connected to ECU 30. Notification device 40 performs display output using characters and graphics, through a monitor output display unit and the like provided within a vehicle cabin. ECU 30 transmits, to notification device 40, an output signal for causing notification device 40 to perform the display output including "welding undetected". In response to the output signal, notification, device 40 notifies a user aurally and/or visually thru the vehicle is ready for traveling, through audio output, lighting-up of an indicator lamp, and the like.

A vehicle ECU not shown generates a request output PR requested for first power storage device BAT1 and second, power storage device BAT2. ECU 30 generates a control signal PWC for driving converter unit 10 based on voltages VB1, VB2 and voltages VL, VH, in accordance with an accelerator pedal position, a vehicle speed, request output PR, and the like, and outputs generated control signal PWC to converter unit 10.

Further, ECU 30 generates control signal PW1 based on a rotation speed of motor generator MG2, a current, and voltage VH. By ECU 30 outputting generated control signal PW1 to inverter unit 20, inverter unit 20 adjusts rotational drive forces of motor generators MG1, MG2.

Furthermore, ECU 30 determines remaining capacities SOC indicating remaining capacities of first power storage device BAT1 and second power storage device BAT2, and an outputtable power upper limit value WOUT (in watts), based on voltages VB1, VB2 and the values of current I1, I2 detected by current sensors 52, 54. A value indicating a remaining capacity SOC is defined by the ratio of an actual charged capacity to a rated capacity. For example, when a power storage device is fully charged, the ratio is defined as 100%, and when the power storage device is fully discharged, the ratio is defined as 0%.

Comparative Example

Figure 2:
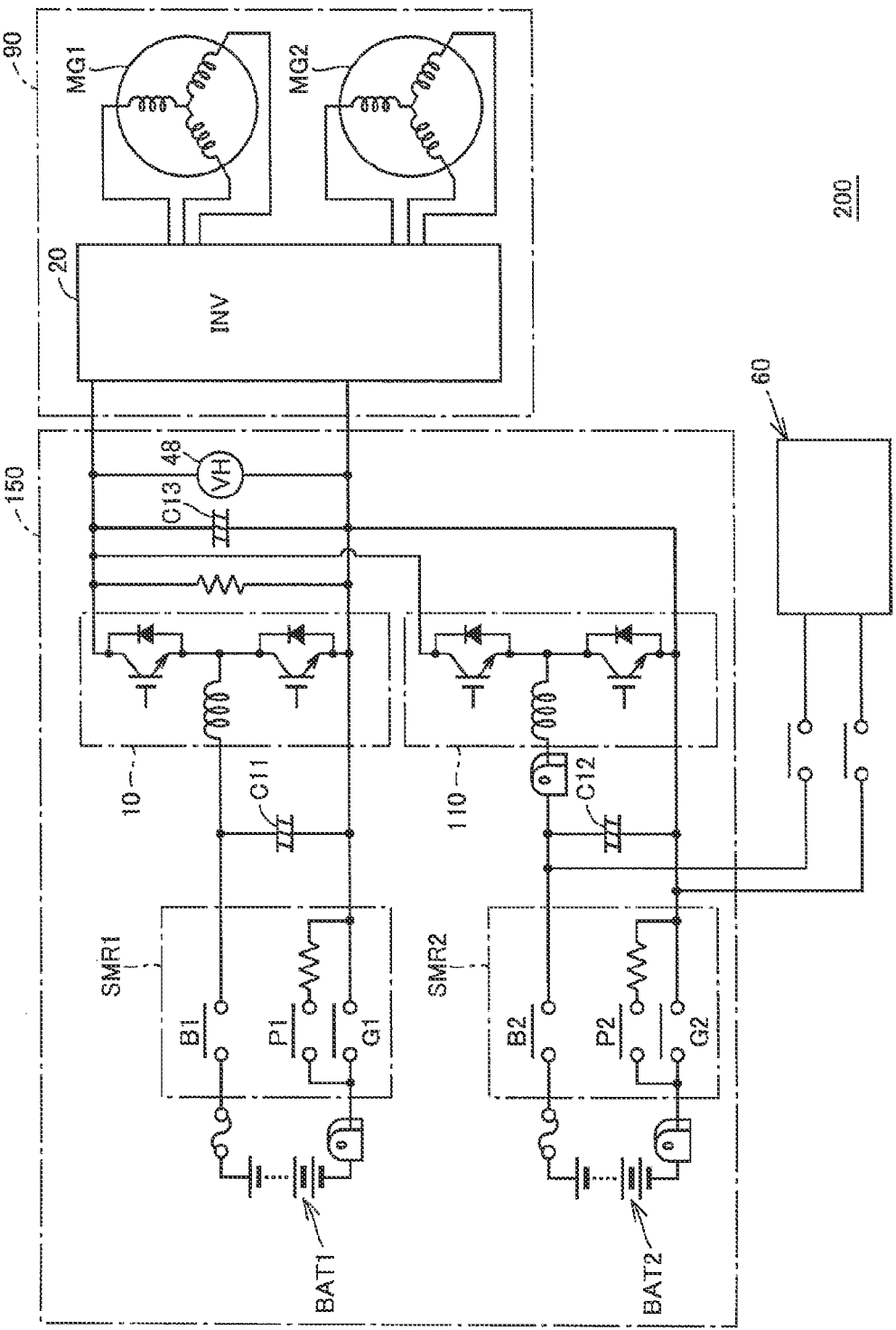
FIG. 2 is a view showing a configuration of a hybrid vehicle equipped with a power supply system in a comparative example.

FIG. 2 is a view showing a configuration of a hybrid vehicle 200 equipped with a power supply system 150 in a comparative example. It is noted that parts identical to those in the embodiment will be designated by the same reference numerals, and the description thereof will not be repeated.

Referring to FIG. 2, in hybrid vehicle 200 in the comparative example, when compared with the configuration of power supply system 50 in FIG. 1, power supply system 150 includes a second converter unit 110 provided on the side of second power storage device BAT2 for converting a voltage of electric power to be supplied to inverter unit 20 as with converter unit 10 for first power storage device BAT1.

In hybrid vehicle 200 in the comparative example configured as described above, in so-called EV traveling in which the vehicle travels using only drive forces by motor generators MG1, MG2, electric power from second power storage device BAT2 stepped up by second converter unit 110 is supplied to inverter unit 20, alone or together with supply of electric power from first power storage device BAT1.

Figure 3:
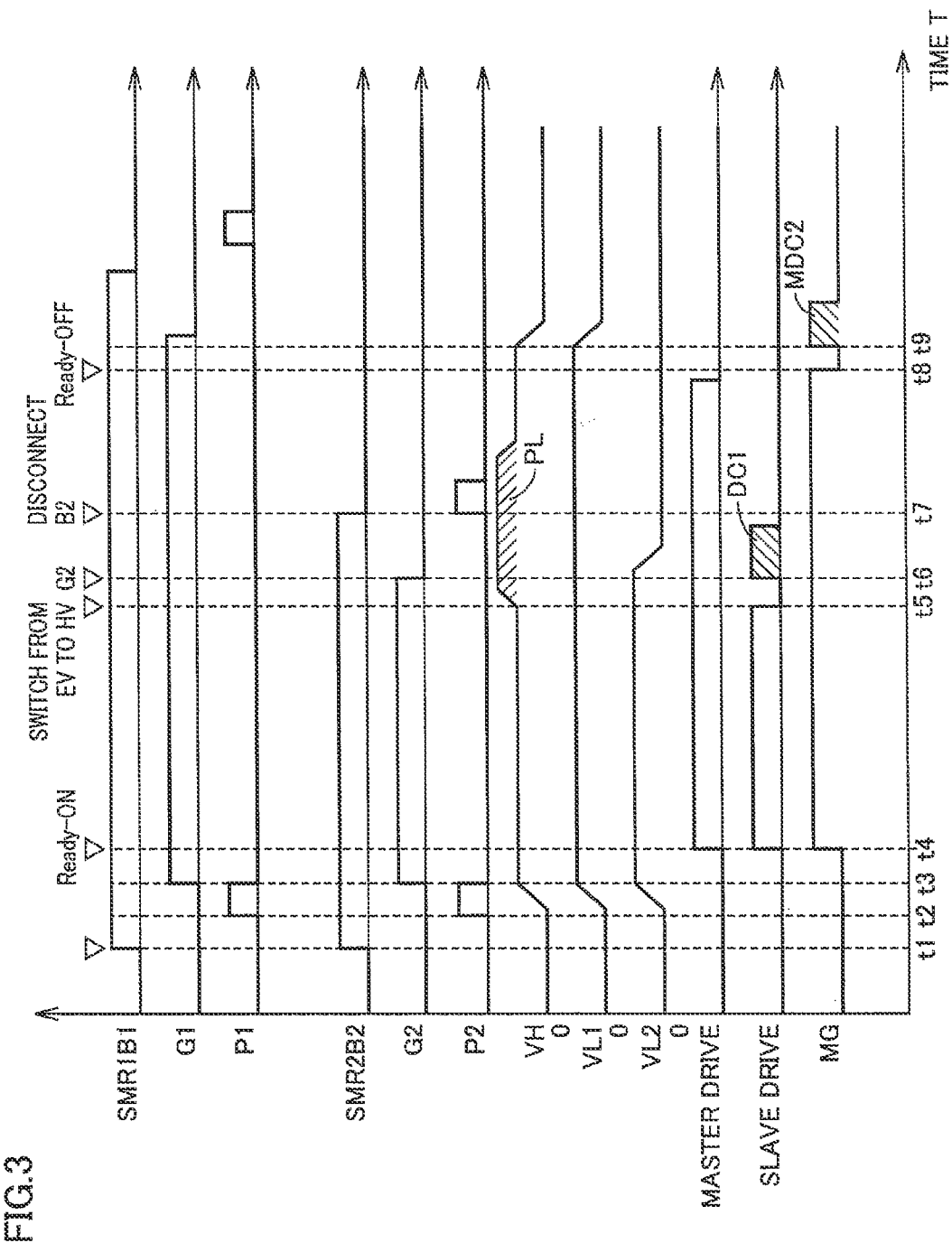
FIG. 3 is a time chart showing details of an operation in a case where processing of the power supply system in FIG. 2 is performed.

FIG. 3 is a time chart showing changes of voltages VL1, VL2, and VH caused by connecting and disconnecting system main relays SMR1, SMR2 when power supply system 150 is started in the comparative example.

In hybrid vehicle 200, a check for welding is performed on each contact point of system main relays SMR1, SMR2 from a time point t1 at which the vehicle is started to a time point t4 at which preparation, for starting a control operation required for traveling is completed in each unit and a Ready-ON state is established. For example, a check for yielding or non-welding is performed by determining whether or not a current conducts when a connection state and a disconnection state of each contact point are switched, based on a charge accumulated in first and second capacitors C11, C12.

When a Ready-ON state is established at time point t4 inverter unit 20 receives supply of voltage VH, and enters a state where it rotationally drives motor generator MG2 to allow the vehicle to start traveling.

Here, it is assumed that, after the vehicle starts traveling, remaining capacity SOC of second power storage device BAT2 is reduced, and thereby EV traveling, in which the drive force has been mainly obtained from motor generator MG2, is switched to HV traveling. In which the drive force of an engine not shown, is additionally used, at a time point t5.

Second power storage device BAT2 having reduced remaining capacity SOC is disconnected from power supply system 150. On this occasion, an ECU not shown performs a check for welding on system main relay SMR2.

Since motor generators MG1, MG2 are rotationally driven while hybrid vehicle 200 is traveling, discharging of a remaining charge using motor generators MG1, MG2 cannot be performed. Discharging of a remaining charge using a motor generator can be performed, for example, by using a technique of applying a current having only a magnetic field component to the motor generator to discharge the remaining charge in a capacitor without rotation (hereinafter referred to as "motor discharging").

Thus, ECU 30 steps up voltage VH to a voltage higher than the voltage of second power storage device BAT2 to suppress a current from flowing from second power storage device BAT2 to drive device 90, and drives only switching element 12 of converter unit 110 at a time point t6 to perform discharging DC1 for discharging a remaining charge in capacitor C12.

Thereby, ECU 30 checks whether contact point G2, for which an instruction for opening has been output, is welded or not. For example, if contact point G2 is welded, voltage VL2 is not reduced because the voltage of second power storage device BAT2 is applied. If contact point G2 is disconnected, voltage VL2 is reduced by discharging DC1.

Further, ECU 30 may detect whether contact point B2 is welded, by outputting a control signal at a time point t7 to connect a contact point P2 and disconnect contact point B2. Thus, is a configuration in which second converter unit 110 is provided on the side of second power storage device BAT2 to be disconnected, even during traveling, a check for welding can be performed on each contact point of system main relay SMR2, based on whether the remaining charge in second capacitor C12, which is obtained when voltage VH is set to be higher than the voltage of second power storage device BAT2 and a discharging operation is performed in second converter unit 110, is discharged or not.

At a time point t8, an instruction to disconnect all of the contact points is output to system main relays SMR1, SMR2 to establish a Ready-OFF state, and an instruction to stop an inverter is also output from ECU 30 to inverter unit 20. It is noted that, in a case where system main relay SMR2 is disconnected while the vehicle is traveling as shown in FIG. 3, system main relay SMR2 is kept disconnected at time point t8. Further, control signal PWI output from ECU 30 is input to inverter unit 20 to stop rotational driving of motor generator MG2.

At a time point t9, ECU 30 performs motor discharging MDC2 on motor generators MG1, MG2 to perform a check for welding on each contact point of system main relay SMR1.

As described above, in hybrid vehicle 200 in the comparative example, when second power storage device BAT2 is disconnected while the vehicle is traveling, second converter unit 110 is stopped. Then, pre-stepping-up PL of voltage VH is performed, and a switching element of second converter unit 110 is driven to perform an operation of discharging the charge in capacitor C12. By detecting a change in voltage VL2 at that time, a check for welding can be performed on each contact point.

Welding Detection Control in the Present Embodiment

In contrast, the configuration of the embodiment shown in FIG. 1 is directed to improving power energy efficiency by omitting second converter unit 110. When a check for welding is performed on system main relay SMR2 in such a power supply system, it is necessary to use second capacitor C2, but a charge in second, capacitor C2 cannot be discharged during traveling. Therefore, during traveling, a check for welding cannot be performed on each contact point of system main relay SMR2 on the side of disconnected second power storage device BAT2.

In addition, in a case where motor discharging is performed using motor generators MG1, MG2, it is necessary to perform it after the vehicle finishes traveling, and thus there may arise a problem that system main relay SMR2 is required to be disconnected from power supply system 50 while the vehicle is traveling and reconnected after the vehicle finishes traveling. If the number of times such connection and disconnection are performed is increased, it may lead to a shortened life of system main relay SMR2.

When, second power storage device BAT2 is disconnected from drive device 90 during traveling, ECU 30 for the power supply system in accordance with the present embodiment disconnects one of contact point B2 and contact point G2 of system main relay SMR2, and causes the other contact point to be kept connected. Hybrid vehicle 100 continues traveling using electric power supplied from first power storage device BAT1 to drive device 90.

Then, after the vehicle finishes traveling, ECU 30 performs a check for welding without reconnecting system main relay SMR2. This can suppress an increase in the number of times system main relay SMR2 is connected and disconnected.

It is noted that, in FIG. 4, a description will be given of an exemplary case where contact point G2 is disconnected and contact point B2 is kept connected.

Figure 4:
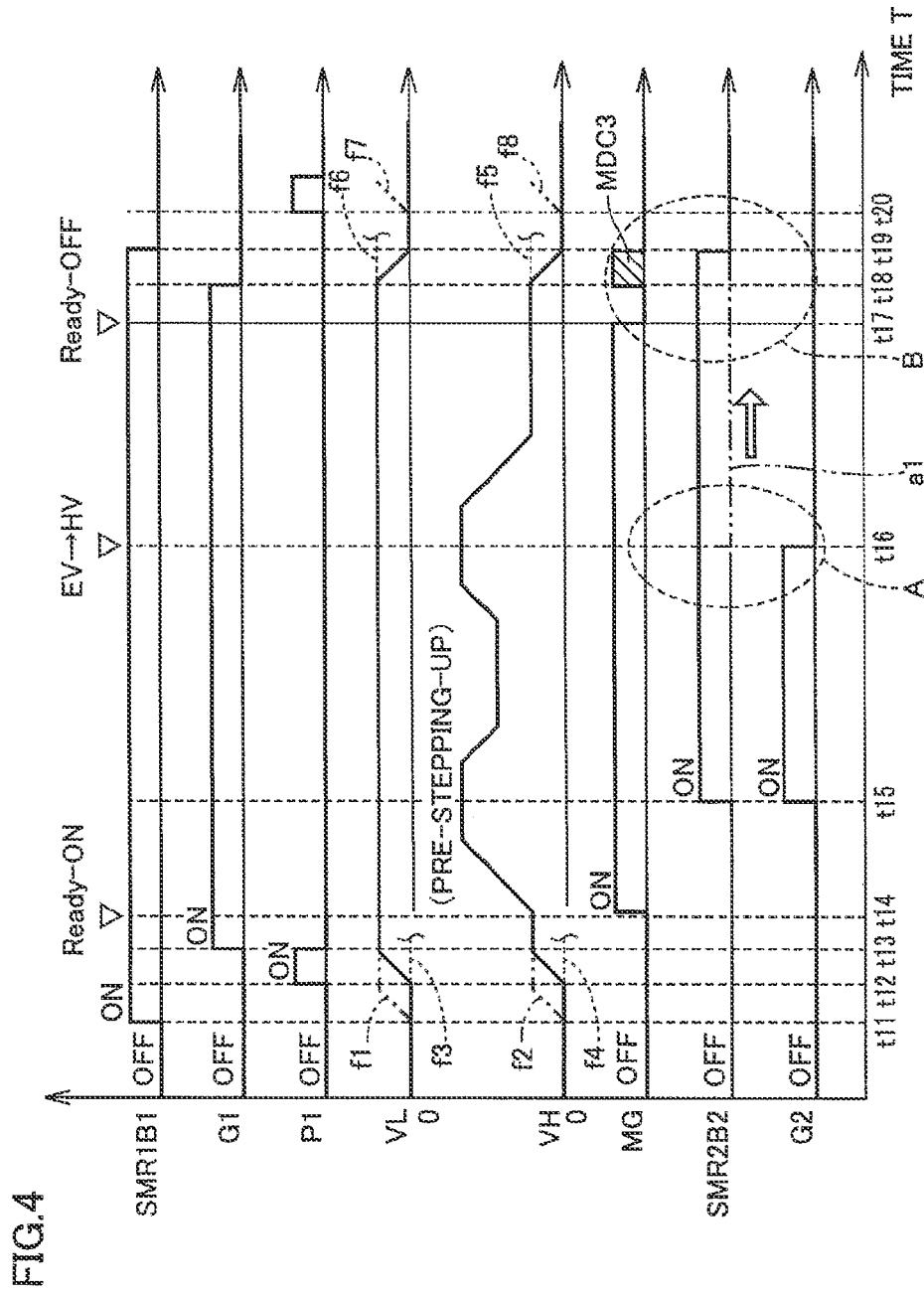
FIG. 4 is a time chart showing details of an operation in a case where processing of the power supply system in accordance with the embodiment is performed.

FIG. 4 is a time chart showing details of an operation in a case where processing of power supply system 50 in accordance with the present embodiment is performed.

Referring to FIG. 4, when hybrid vehicle 100 is started at a time point t11, contact point B1 of system main relay SMR1 is connected, and contact point P1 is connected at a time point t12. After voltages VL, VH are stepped up by precharging first capacitor C1 and second capacitor C2, contact point G1 is connected and contact point P1 is disconnected. On this occasion, a check for welding may be performed on contact point G1 or contact point P1 of system main relay SMR1, as in the description in FIG. 3.

In FIG. 4, two-dot chain lines f1, f2 indicate changes in voltage VH and voltage VL in a case where welding occurs, and broken lines f3, f4 indicate changes in voltage VH and voltage VL in a case where a break occurs.

When a Ready-ON state is established at a time point t14, motor generators MG1, MG2 can be rotationally driven. Then, in order to connect system main relay SMR2, voltage VH is pre-stepped up by converter unit 10 to prevent electric power from feeing supplied front second power storage device BAT2 to drive device 90, and system main relay SMR2 is connected at a time point t15. Thereby, EV traveling using first power storage device BAT1 and second power storage device BAT2 can be performed.

Next, for example when remaining capacity SOC of second power storage device BAT2 is reduced, and EV traveling is shifted to HV traveling using first power storage device BAT1 and engine 2 at a time point t16, only contact point G2 of system main relay SMR2 is disconnected by control signal SM2 from ECU 30. On this occasion, contact point B2 is not disconnected in association with the disconnection of contact point G2, as shown in a situation encircled by a dotted line A in FIG. 4. (For comparison, the waveform in the case that contact point B2 is disconnected is shown as a two-dot chain line a1 in FIG. 4.) Contact point B2 of system main relay SMR2 is kept connected, after an instruction for Ready-OFF is output at a time point t17, until a check for welding is performed.

Since contact point G2 is disconnected at and after a time point t16, no electric power is supplied from second power storage device BAT2 to inverter unit 20.

When the vehicle stops traveling and an instruction for Ready-OFF is output at time point t17, a check for welding is performed on system main relays SMR1, SMR2. ECU 30 disconnects system main relay SMR1 at a time point t18, and starts discharging of a remaining charge in second capacitor C2 by motor discharging MDC3, in response to control signal PWI. On this occasion, since contact point B2 of system mala relay SMR2 is kept connected in the example of FIG. 4, reconnection of contact point B2 at time point, t18 to perform a check for welding can be omitted.

If contact points G1, G2 of system main relays SMR1, SMB2 are disconnected as instructed, the remaining charge in second capacitor C2 is appropriately discharged by a discharging operation, and voltage VH and voltage VL are reduced.

If the charge cannot be discharged by the discharging operation, that is, if voltages VH, VL are not reduced as indicated by broken lines f5, f6, it can be determined that there is a high possibility that welding occurs in at least one of contact point G1 of system main relay SMR1 and contact point G2 of system main relay SMR2, and electric power is supplied from first power storage device BAT1 and/or second power storage device BAT2. Namely, if the charge cannot be discharged by the discharging operation, ECU 30 can determine that welding occurs in at least one of contact point G1 of system main relay SMR1 and contact point G2 of system main relay SMR2.

Further, after contact point B1 of system main relay SMR1 is turned off at a time point t19 by control signal SM1 output from ECU 30, welding detection may be performed on contact point B1 at a time point t20. In this case, contact point P1 is connected by control signal SM1 at a time point t20 on the premise that the charge in first and second capacitors C1, C2 has been fully discharged by motor discharging MDC3, that is, no welding occurs in contact points G1, G2. If contact point B1 is welded on this occasion, the voltage from first power storage device BAT1 is applied, and thus voltages VL, VH are increased as indicated by broken lines f7, f8. In this manner, ECU 30 can determine that contact point B1 is welded based on the increase in voltages VL, VH caused by connecting contact point P1.

Figure 5:
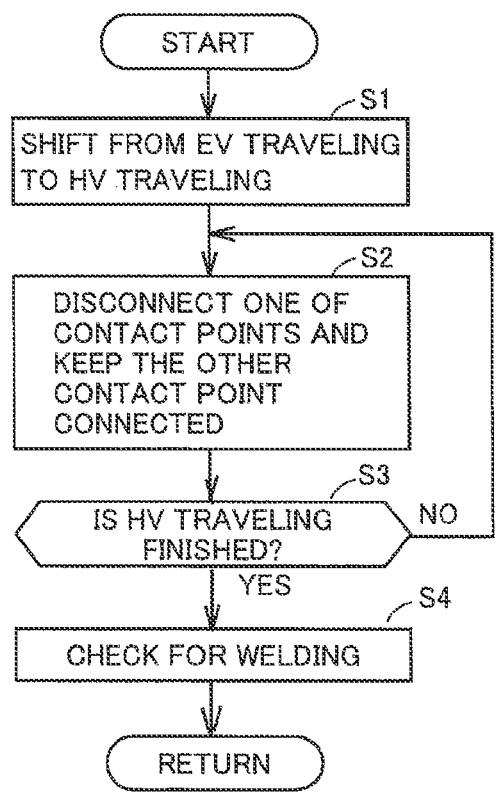
FIG. 5 is a flowchart illustrating a process for performing a check for welding.

FIG. 5 is a flowchart illustrating processing performed by ECU 30 to perform the process for performing a check for welding described in FIG. 4.

When the processing of a check for welding is started in ECU 30, in step S1, hybrid vehicle 100 detects remaining capacity SOC of second power storage device BAT2 during EV traveling. When ECU 30 detects a reduction in remaining capacity SOC and determines that a shift from EV traveling to HV traveling is required, ECU 30 advances the processing to step S2.

In step S2, ECU 30 outputs control signal SM2 for disconnecting one of contact point B2 and contact point G2, to system main relay SMR2. Thereby, ECU 30 disconnects second power storage device BAT2 from power supply system 50 and stops supply of electric power from second power storage device BAT2. HV traveling is continued in this state.

In step S3, ECU 30 determines whether nor not HV traveling is finished. If HV traveling is not finished (NO in step S3), ECU 30 returns the processing back to step S2 and continues HV traveling.

If HV traveling is finished (YES in step S3), ECU 30 advances the processing to step S4 to perform a check for welding which is performed when traveling is finished, as described in FIG. 4.

By performing the processing in accordance with such a process, there is no need to reconnect contact point B2 of system main relay SMR2 when a check for welding is performed in a state B shown in FIG. 4 where HV traveling is finished.

It is noted that, if it is determined in the check for welding performed when traveling is finished, that welding occurs as described in FIG. 4, which of system main relays SMB1, SMR2 has welding may be further determined.

Specifically, if it is determined that welding occurs in any of contact points G1, G2 of system main relay SMR1 and system main relay SMR2 in the example of FIG. 4, motor discharging is performed again with contact point B1 or contact point B2 being disconnected, and the contact point having welding is specified based on changes in voltages VH, VL at that time.

Figure 6:
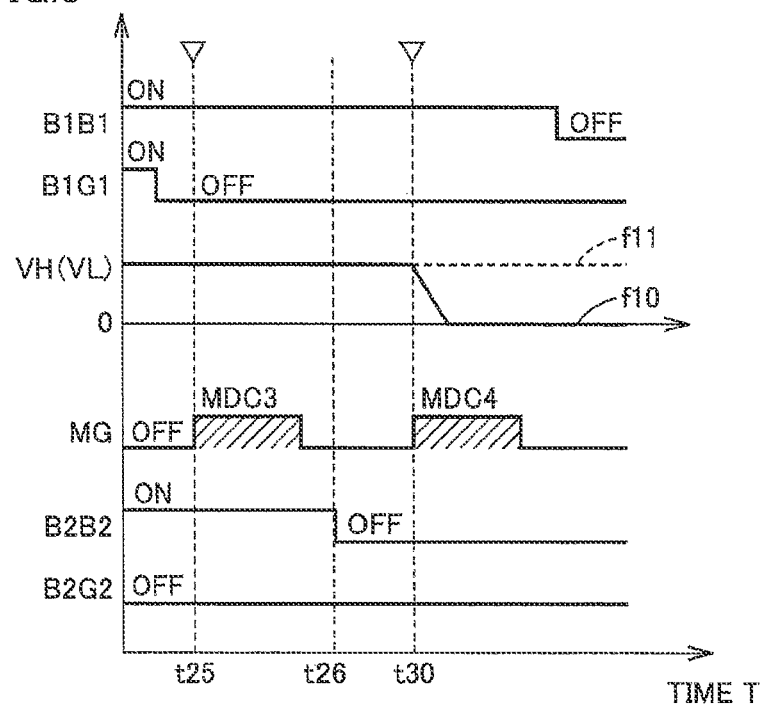
FIG. 6 is a time chart showing an operation in a case where discharging for specifying the location of the welding is performed with one contact point being disconnected.

FIG. 6 is a time chart showing an operation in a case where discharging for specifying the location of the welding is performed with contact point B2 being disconnected.

Referring to FIG. 6, at a time point t25, motor discharging MDC3 described in FIG. 4 is performed. If welding occurs in any of contact points G1, or G2 on this occasion, voltages VH, VL are not reduced as shown in FIG. 6.

When it is determined that welding occurs in contact point G1 or G2 based on the fact that voltages VH, VL are not reduced, contact point B2 of system main relay SMR2 is disconnected at a time point t26 to interrupt supply of electric power from second power storage device BAT2, and only contact point B1 of system main relay SMR1 is kept connected. Then, at a time point t30, motor discharging MDC4 is performed.

In this case, if contact point B1 is normal and is not welded, the remaining charge in second capacitor C2 is discharged by motor discharging MDC4 (a solid line f10) because electric power is not supplied from both first power storage device BAT1 and second power storage device BAT2. In this case, it can be determined that welding occurs in contact point G2 of system main relay SMR2.

On the other hand, if welding occurs in contact point B1, the remaining charge in second capacitor C2 is not discharged by motor discharging MDC4, as indicated by a broken line f11 in FIG. 6.

Thus, which of system main relay SMR1 and system main relay SMR2 has welding can be distinguished.

In this manner, by performing motor discharging again with both of the contact points of one of system main relay SMR1 and system main relay SMR2 being disconnected, which of system main relay SMR1 and system main relay SME2 has welding can be distinguished.

Figure 7:
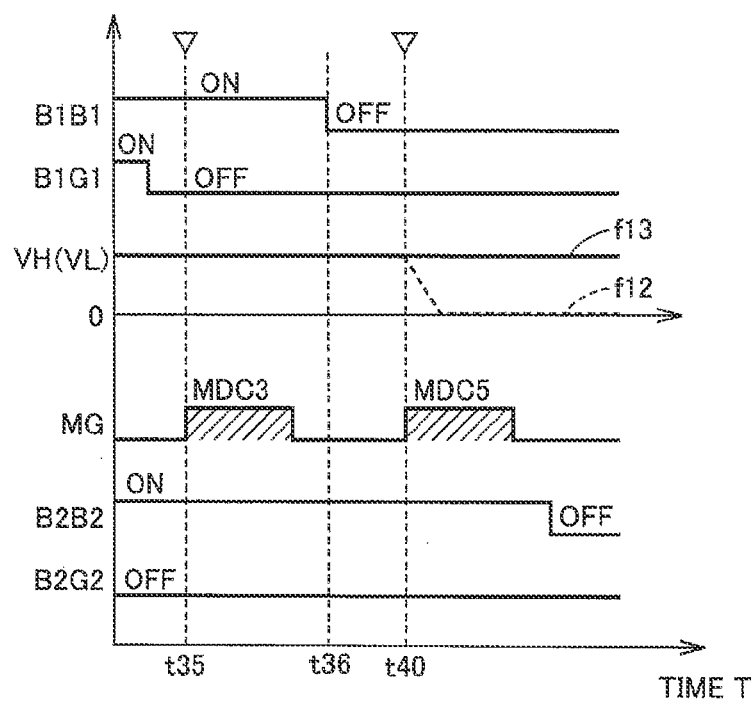
FIG. 7 is a time chart showing an operation in a case where discharging for specifying the location of the welding is performed with the other contact point being disconnected.

FIG. 7 is a time chart showing an operation in a case where discharging for specifying the location of the welding is performed with contact point B1 being disconnected.

Referring to FIG. 7, at a time point t35, motor discharging MDC3 described in FIG. 4 is performed. If welding occurs in any of contact points G1, G2 on this occasion, voltages VH, VL are not reduced as shown in FIG. 7.

When it is determined that welding occurs in contact point G1 or G2 based on the fact that voltages VH, VL are not reduced, contact point B1 of system main relay SMR1 is disconnected at a time point t36, and only contact point B2 of system main relay SMR2 is kept connected. Then, at a time point t40, motor discharging MDC5 is performed.

In this case, if contact point B1 is normal and is not welded, the remaining charge in second capacitor C2 is discharged by motor discharging MDC5 (a broken line f12) because electric power is not supplied from both first power storage device BAT1 and second power storage device BAT2. In this case, it can be determined that welding occurs in contact point G1 of system main relay SMR1.

On the other hand, if welding occurs in contact point B1, the remaining charge in second capacitor C2 is not discharged by motor discharging MDC5, as indicated by a solid line f13 in FIG. 7.

Thus, which of system main relay SMR1 and system main relay SMR2 has welding can be distinguished.

Therefore, by performing motor discharging again with both of the contact points of one of system main relay SMR1 and system main relay SMR2 being disconnected, which of system main relay SMR1 and system main relay SMR2 has welding can be distinguished.

As described above, by disconnecting a terminal which has been kept connected after motor discharging MDC3 is performed, the charge maintaining voltages VL, VH in first capacitor C1 and second capacitor C2 is discharged, and thereby which of system main relay SMR1 and system main relay SMR2 has the location of welding can be specified.

Figure 8:
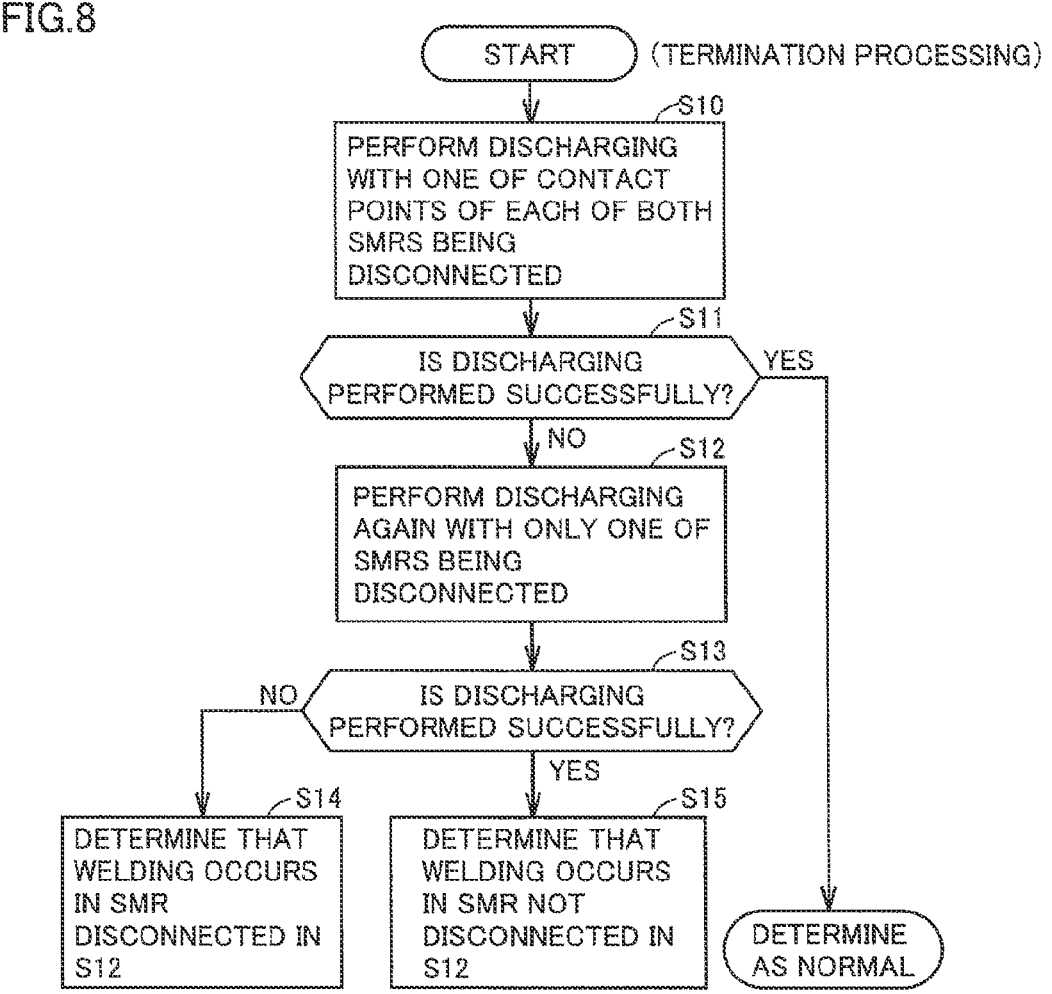
FIG. 8 is a flowchart illustrating a process in a case where processing in FIGS. 6, 7 is performed.

FIG. 8 is a flowchart illustrating processing for performing a check for welding which is performed by the discharging for specifying the location of the welding described in FIGS. 6, 7.

When ECU 50 starts termination processing, in step S10, ECU 30 outputs a control signal to disconnect one of the contact points of each of system main relays SMR1, SMR2, to discharge first capacitor C1 and second capacitor C2. If discharging of the charge for voltage VH is performed successfully in step S11 (YES in step S11), ECU 30 advances the processing to determination as normal, and completes the termination processing.

If discharging of the charge for voltage VH is not performed successfully in step S11 (NO in step S11), ECU 30 advances the processing to step S12.

In step S12, ECU 30 outputs control signal SM1, SM2 for disconnecting both contact points of one of system main relay SMR1 and system main relay SMR2 as shown in FIG. 6 or 7. Further, ECU 30 performs motor discharging MDC4, MDC5 again on inverter unit 20.

In step S13, ECU 30 detects voltage VH (or VL) of second capacitor C2 (or C1) to determine whether or not discharging of the charge is performed successfully. If ECU 30 determines that discharging of the charge is not performed successfully (NO in step S13), ECU 30 advances the processing to step S14. If ECU 30 determines that discharging of the charge is performed successfully (YES in step S13), ECU 30 advances the processing to step S15.

In step S15, ECU 30 determines that system main, relay SMR1 or SMR2 which has not been disconnected in step S12 is kept connected, and that, even though ECU 30 outputs control signal SM1, SM2 to disconnect a contact point, the contact point has been kept connected by welding.

In step S14, ECU 30 determines that system main relay SMR1 or SMR2 which has been disconnected in step S12 is kept connected, and that, even though ECU 30 outputs control signal SM1, SM2 to disconnect a contact point the contact point has been kept connected by welding.

Thus, by performing welding detection with system main relay SMR1 or SMR2 being disconnected one at a time, welding detection can be efficiently performed on each contact point.

In addition, in the present embodiment, traveling is continued with contact point B2 or G2 of system main relay SMR2 being kept connected by ECU 30 until welding detection is performed, and there is no need to reconnect contact point B2 or G2 when a check for welding is performed after Ready-OFF.

Therefore, wasted operations in association with disconnection and connection of contact point B2, G2 are reduced, and an increase in the number of times system main relay SMR2 is actuated is suppressed. Thereby, accelerated deterioration can be avoided, and an increased life can be achieved.

Further, disconnection is performed at a time point when EV traveling, in which the vehicle travels using the drive force of motor generator MG2, is shifted to HV traveling, in which the drive force of engine 2 is additionally used. Contact point B2 or contact point G2 of system main relay SMR2 to which control signal SM2 for disconnection is output at this time point is not required to be reconnected when a check for welding is performed after Ready-OFF.

Furthermore, in a case where termination processing is performed during EV traveling without shifting to HV traveling, the location of the welding can also be specified through the same sequence. In addition, opportunities for performing detection on both contact points B2, G2 can be equalized, for example, by alternately switching between contact points B2 and G2 as detection targets for each trip or for each time traveling and charging are performed.

Further, even when system main relay SMR2 on the side of second power storage device BAT2 does not have a precharging function, an increased life can be achieved by equalizing opportunities for performing detection on both contact points B2, G2, for example, by alternately switching between contact points B2 and G2 as detection targets for each trip or for each time traveling and charging are performed.

Furthermore, welding detection can also be performed when the number of parts such as second converter unit 110, capacitor C12, and contact point P2 including a limiting resistor shown in the comparative example is decreased.

As has been described above, according to the present invention, when second power storage device BAT2 is disconnected from the drive device by ECU 30 while hybrid vehicle 100 is traveling, hybrid vehicle 100 continues traveling using electric power supplied from the first power storage device to the drive device, with one of the first contact point and the second contact point of a second switch being disconnected and the other contact point being connected.

After the hybrid vehicle finishes traveling, a discharging operation for discharging the charge remaining in the first capacitor and the second capacitor is performed with one contact point of the second switch being disconnected. If the charge is not discharged appropriately, it is determined that welding occurs in at least one of a first switch and the second switch.

Even when whether or not welding occurs is determined, there is no need to perform an operation of reconnecting the first contact point or the second contact point. Thereby, the number of times connection is established can be decreased, and a defect can be checked efficiently.

The embodiment described above will be summarized in the end with reference to the drawings again.

As shown in FIG. 1, hybrid vehicle 100 includes power supply system 50, drive device 90 driving using electric power supplied from power supply system 50, and ECU 30 performing control of power supply system 50 or drive device 90.

Power supply system 50 includes first power storage device BAT1 capable of supplying electric power to drive device 90, second power storage device BAT2 electrically connected to paths supplying the electric power from first power storage device BAT1 to drive device 90, and capable of supplying electric power to drive device 90, converter unit 10 converting a voltage between first power storage device BAT1 and drive device 90, system main relay SMR1 switching between connection and disconnection between first power storage device BAT1 and converter unit 10, first capacitor C1 provided between paths coupling system main relay SMR1 to converter unit 10, system main relay SMR2 having a first contact point connected to the positive electrode of second power storage device BAT2 and a second contact point connected to the negative electrode of second power storage device BAT2 for individually switching between connection and disconnection to and from drive device 90, and second capacitor C2 connected between paths coupling converter unit 10 to drive device 90. Second power storage device BAT2 is connected to drive device 90 in parallel with first power storage device BAT1.

When ECU 30 disconnects second power storage device BAT2 from drive device 90 while hybrid vehicle 100 is traveling, ECU 30 disconnects one of contact point B2 and contact point G2 of system main relay SMR2 and causes the hybrid vehicle to continue traveling using the electric power supplied from first power storage device BAT1 to drive device 90. After the hybrid vehicle finishes traveling, ECU 30 performs a discharging operation for discharging the charge remaining in first capacitor C1 and second capacitor C2 with the one contact point of system main relay SMR2 being disconnected. If the charge is not discharged appropriately, ECU 30 determines that welding occurs in at least one of system main relay SMR1 and system main relay SMR2.

Preferably, system main relay SMR1 has first contact point B1 connected to the positive electrode of first power storage device BAT1 and second contact point G1 connected to the negative electrode of first power storage device BAT1 for individually switching between connection and disconnection to and from drive device 90. If the charge is not discharged appropriately even when the discharging operation is performed with the one contact point of system main relay SMR2 being disconnected, ECU 30 disconnects both of first contact point B1 and second contact point G1 of system main relay SMR1 or both of first contact point B2 and second contact point G2 of system main relay SMR2 and performs a second discharging operation. If the charge is not discharged appropriately from first capacitor C1 and second capacitor C2 after the second discharging operation is performed, the location of the welding in system main relay SMR1 or system main relay SMR2 is specified.

More preferably, first power storage device BAT1 includes a high-output type battery, and second power storage device BAT2 includes a high-capacity type battery.

More preferably, the vehicle further includes converter unit 10 converting a voltage between first power storage device BAT1 and drive device 90.

More preferably, drive device 90 includes motor generators MG1, MG2 and engine 2, and ECU 30 disconnects system main relay SMR2 in response to a shift from EV traveling in which the vehicle is caused to travel using the drive force of motor generator MG2 to HV traveling in which the drive force of engine 2 is additionally used.

According to another aspect of the present invention, provided is a method for controlling a power supply system for supplying electric power to a load. The power supply system includes first power storage device BAT1 capable of supplying electric power to the load, second power storage device BAT2 electrically connected to paths supplying the electric power from first power storage device BAT1 to the load, and capable of supplying electric power to the load, converter unit 10 converting a voltage between first power storage device BAT1 and the load, system main relay SMR1 switching between connection and disconnection between first power storage device BAT1 and converter unit 10, first capacitor C1 provided between paths coupling system main relay SMR1 to converter unit 10, system main relay SMR2 having a first contact point connected to the positive electrode of second power storage device BAT2 and a second contact point connected to the negative electrode of second power storage device BAT2 for individually switching between connection and disconnection to and from the load, and second capacitor C2 connected between paths coupling converter unit 10 to the load.

The method for controlling includes the steps of: disconnecting, when second power storage device BAT2 is disconnected from the load while a vehicle is traveling, one of the first contact point and the second contact point of system main relay SMR2, and causing the vehicle to continue traveling using the electric power supplied from first power storage device BAT1 to the load; performing, after the vehicle finishes traveling, a discharging operation for discharging a charge remaining in first capacitor C1 and second capacitor C2 with the one contact point of system main relay SMR2 being disconnected; and determining, if the charge is not discharged appropriately, that welding occurs in at least one of system main relay SMR1 and system main relay SMR2.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A vehicle, comprising:
   a power supply system;
   a drive device driving using electric power supplied from said power supply system; and
   a control device performing control of said power supply system and said drive device, wherein
   said power supply system includes
   a first power storage device capable of supplying electric power to said drive device,
   a second power storage device connected to said drive device in parallel with said first power storage device,
   a first switch switching between supply and interruption of the electric power between said first power storage device and said drive device,
   a second switch having a first contact point connected to a positive electrode of said second power storage device and a second contact point connected to a negative electrode of said second power storage device for individually switching between supply and interruption of electric power from said second power storage device to said drive device, and
   a capacitor connected between paths coupling said second switch to said drive device, and
   when said control device disconnects said second power storage device from said drive device while the vehicle is traveling, said control device disconnects one of the first contact point and the second contact point of said second switch and causes the vehicle to continue traveling using the electric power supplied from said first power storage device to said drive device, and after the vehicle finishes traveling, said control device performs a discharging operation for discharging a charge remaining in the capacitor with the one contact point of said second switch being disconnected, and if the charge is not discharged appropriately, said control device determines that welding occurs in at least one of said first switch and said second switch.

2. The vehicle according to claim 1, wherein
   said first switch has a first contact point connected to a positive electrode of said first power storage device and a second contact point connected to a negative electrode of said first power storage device for individually switching between supply and interruption of the electric power to said drive device, and
   if the charge is not discharged appropriately even when the discharging operation is performed with the one contact point of said second switch being disconnected, said control device disconnects both of the first contact point and the second contact point of one of said first switch and said second switch and performs a second discharging operation, and if the charge is not discharged appropriately from said capacitor after the second discharging operation is performed, said control device specifies a location of the welding in said first switch or said second switch.

3. The vehicle according to claim 1, wherein
   said first power storage device includes a high-output type battery, and
   said second power storage device includes a high-capacity type battery.

4. The vehicle according to claim 1, further comprising a voltage conversion device converting a voltage between said first power storage device and said drive device.

5. The vehicle according to claim 1, wherein
   said drive device includes a rotating electric machine and an engine, and
   said control device disconnects said second switch in response to a shift from EV traveling in which the vehicle is caused to travel using a drive force of said rotating electric machine to HV traveling in which a drive force of said engine is additionally used.

6. A power supply system for supplying electric power to a load, comprising:
   a first power storage device capable of supplying electric power to said load;
   a second power storage device connected to said load in parallel with said first power storage device;
   a first switch switching between supply and interruption of the electric power between said first power storage device and said load;
   a second switch having a first contact point connected to a positive electrode of said second power storage device and a second contact point connected to a negative electrode of said second power storage device for individually switching between supply and interruption of electric power from said second power storage device to said load;
   a capacitor connected between paths coupling said second switch to said load; and
   a control device, wherein
   when said control device disconnects said second power storage device from said load while a vehicle is traveling, said control device disconnects one of the first contact point and the second contact point of said second switch and causes the vehicle to continue traveling using the electric power supplied from said first power storage device to said load, and after the vehicle finishes traveling, said control device performs a discharging operation for discharging a charge remaining in the capacitor with the one contact point of said second switch being disconnected, and if the charge is not discharged appropriately, said control device determines that welding occurs in at least one of said first switch and said second switch.

7. A method for controlling a power supply system for supplying electric power to a load,
   said power supply system including
   a first power storage device capable of supplying electric power to said load,
   a second power storage device electrically connected to paths supplying the electric power from said first power storage device to said load, and capable of supplying electric power to said load, a first switch switching between supply and interruption of the electric power between said first power storage device and said load, a second switch having a first contact point connected to a positive electrode of said second power storage device and a second contact point connected to a negative electrode of said second power storage device for individually switching between supply and interruption of the electric power to said load, and a capacitor connected between paths coupling said second switch to said load, said method for controlling comprising the steps of:

disconnecting, when said second power storage device is disconnected from said load while a vehicle is traveling, one of the first contact point and the second contact point of said second switch, and causing the vehicle to continue traveling using the electric power supplied from said first power storage device to said load;

performing, after the vehicle finishes traveling, a discharging operation for discharging a charge remaining in said capacitor with the one contact point of said second switch being disconnected; and determining, if the charge is not discharged appropriately, that welding occurs at least one of said first switch and said second switch.

* * * * *

UNITED STATES PATENT AND TRADEMARK OFFICE
CERTIFICATE OF CORRECTION

| | | |
|---|---|---|
| PATENT NO. | : 9,136,783 B2 | Page 1 of 2 |
| APPLICATION NO. | : 14/044528 | |
| DATED | : September 15, 2015 | |
| INVENTOR(S) | : Noritake Mitsutani | |

It is certified that error appears in the above-identified patent and that said Letters Patent is hereby corrected as shown below:

Specification

At column 1, line 49, change "open No. 2000-142102" to -- open No. 2009-142102 --.

At column 2, line 30, change "point corrected to" to -- point connected to --.

At column 4, line 60, change "current I1 axe used" to -- current I1 are used --.

At column 7, line 29, change "signal PW1 to" to -- signal PWI to --.

At column 7, line 45, change "accordance with me" to -- accordance with the --.

At column 8, lines 43 and 44, change ", notification, device 40 . . . visually thru the" to -- , notification device 40 . . . visually that the --.

At column 8, line 55, change "signal PW1 based on" to -- signal PWI based on --.

At column 8, line 57, change "signal PW1 to" to -- signal PWI to --.

At column 9, line 34, change "which preparation, for" to -- which preparation for --.

At column 9, line 36, change "for yielding or" to -- for welding or --.

At column 10, line 13, change "Thus, is a configuration" to -- Thus, in a configuration --.

At column 10, line 54, change "in second, capacitor" to -- in second capacitor --.

At column 11, line 36, change "from feeing supplied front second" to -- from being supplied from second --.

At column 11, line 64, change "system mala" to -- system main --.

At column 12, line 2, change "SMB2" to -- SMR2 --.

Signed and Sealed this
Fifth Day of July, 2016

Michelle K. Lee
*Director of the United States Patent and Trademark Office*

CERTIFICATE OF CORRECTION (continued)
U.S. Pat. No. 9,136,783 B2

At column 12, line 63, change "SMB1" to -- SMR1 --.

At column 12, line 62, change "finished, that" to -- finished that --.

At column 13, line 11, change "G1, or G2" to -- G1, G2 --.

At column 13, line 39, change "SME2" to -- SMR2 --.

At column 14, line 13, change "ECU 50" to -- ECU 30 --.